United States Patent
Diaz et al.

(10) Patent No.: US 7,436,659 B2
(45) Date of Patent: Oct. 14, 2008

(54) UPSIDE DOWN PC

(75) Inventors: Elizabeth Brandon Swan Diaz, Woodside, CA (US); Yancy Chen, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 540 days.

(21) Appl. No.: 11/197,232

(22) Filed: Aug. 4, 2005

(65) Prior Publication Data

US 2007/0030630 A1 Feb. 8, 2007

(51) Int. Cl.
*G06F 1/20* (2006.01)
(52) U.S. Cl. .................... 361/687; 108/50.01
(58) Field of Classification Search ................. 361/687; 108/50.01
See application file for complete search history.

(56) References Cited

U.S. PATENT DOCUMENTS

| 5,897,178 | A | * | 4/1999 | Ohara | 312/223.2 |
| 5,991,163 | A | * | 11/1999 | Marconi et al. | 361/788 |
| 6,076,473 | A | * | 6/2000 | Conte | 108/50.01 |
| 6,099,094 | A | * | 8/2000 | Lior | 312/223.3 |
| 6,286,440 | B1 | * | 9/2001 | Jyringi | 108/50.01 |

* cited by examiner

*Primary Examiner*—Lisa Lea-Edmonds

(57) ABSTRACT

An entertainment device that includes ventilation openings in a bottom panel of a chassis of the device to reduce the chance that the ventilation openings will be covered and that the entertainment device will overheat. The entertainment device includes a motherboard that is mounted to a top panel of the chassis so that a CPU is mounted to the motherboard upside down within the chassis.

19 Claims, 1 Drawing Sheet

UPSIDE DOWN PC

BACKGROUND OF THE INVENTION

1. Field of the Invention

This invention relates generally to an entertainment device and, more particularly, to an entertainment programmable controller (PC) that includes a CPU mounted upside down within the PC chassis and ventilation openings in a bottom panel of the chassis.

2. Discussion of the Related Art

An entertainment PC, such as the HP z557 Digital Entertainment Center, may be one device of a personal entertainment system. An entertainment PC may provide many functions, such as TV recording functions, computer functions, TV, DVD, movies, home video, music and radio access functions, etc. The entertainment PC may have the "look" of other entertainment system devices, such as DVD players, receivers, amplifiers, etc. Typically, a user will stack the entertainment PC with the other devices on top of each other, or in a suitable racking system. However, a potential problem could exist for the entertainment PC as a result of the positioning of the entertainment system devices because the PC consumes a lot of power and generates a lot of heat.

Known entertainment PC designs typically employ a PC motherboard mounted to a bottom panel within the PC chassis and a CPU mounted to the top surface of the motherboard. Ventilation slots are provided in a top panel of the chassis, and a fan draws fresh cooling air through the ventilation slots. In this configuration, the cooling fan and associated heat sink in the entertainment PC chassis will be facing up. However, because the ventilations slots are in the top panel, it is likely that the ventilation slots will at least at some time be covered with another device, disks, papers, manuals, etc., thus obstructing the air flow through the ventilation slots. Without a proper cooling air flow through the entertainment PC, it is likely that it will overheat and fail.

Further, when the entertainment PC is part of a stack of devices, the hot air being exhausted from the other devices could deflect off of devices or walls, and enter the entertainment PC as preheated air, thus raising the internal ambient temperature of the entertainment PC.

One known solution to address the ventilation concern of an entertainment PC discussed above is to add extra structure to the top panel of the chassis to make it uneven, and thus make it less likely that the slots will be obstructed. However, such a solution degrades the aesthetic appearance of the entertainment PC, and increases the complexity of the design. Also, it is known to put a warning label on the entertainment PC about the implications of covering the ventilation slots. However, sometimes consumers to not consider such warnings.

SUMMARY OF THE INVENTION

In accordance with the teachings of the present invention, an entertainment PC, or other device, is disclosed that includes ventilation openings in a bottom panel of a chassis of the entertainment PC to reduce the chance that the ventilation openings will be covered and that the entertainment PC will overheat. The entertainment PC includes a motherboard that is mounted to a top panel of the chassis, where a CPU is mounted to the motherboard upside down within the chassis. In an alternate embodiment, a display device is mounted to a front panel of the entertainment device above an optical drive device.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an entertainment PC including a CPU mounted upside down within the PC chassis and ventilation slots provided in a bottom panel of the PC chassis is merely exemplary in nature, and is in no way intended to limit the invention or its applications or uses.

Figure 1:
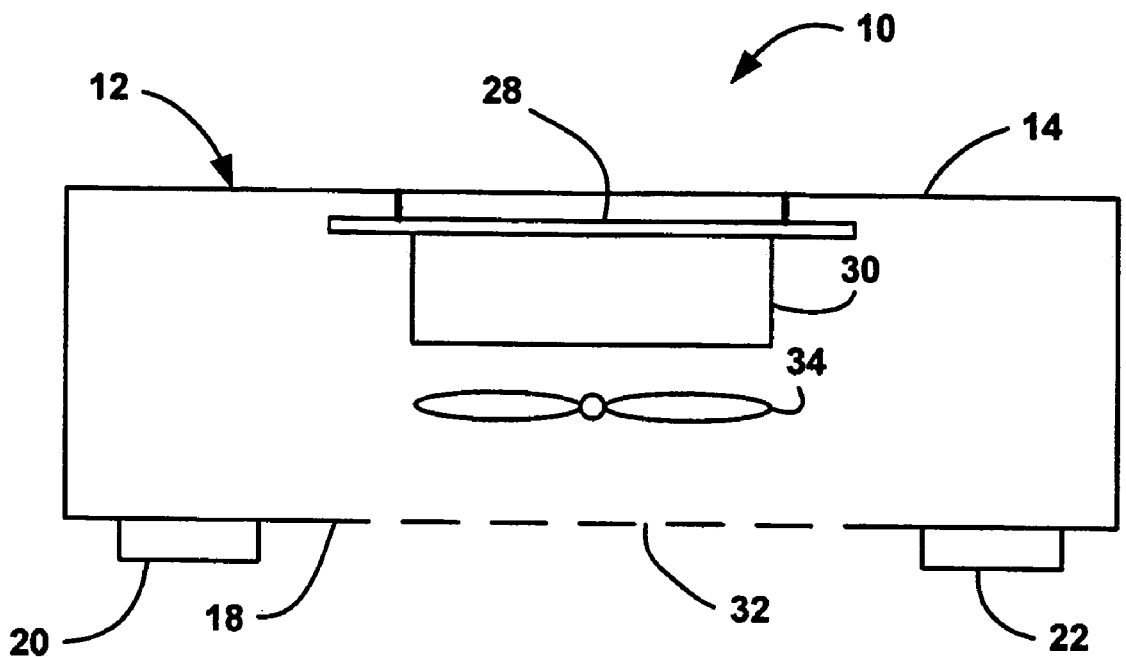
FIG. 1 is a front view of an entertainment PC with a front panel removed to show a CPU mounted upside down within the entertainment PC chassis and ventilation slots in a bottom panel of the chassis, according to an embodiment of the present invention.

FIG. 1 is a front view of an entertainment PC 10 including a chassis 12 having a top panel 14 and a bottom panel 18. Although the discussion herein describes an entertainment PC, as will be appreciated by those skilled in the art, the invention may be applicable for other entertainment or electrical devices. Four feet are mounted to the bottom panel 18 of the PC 10, where two of the feet 20 and 22 are shown. A front panel of the chassis 12 has been removed to show a PC motherboard 28 and a CPU 30 mounted to the motherboard 28 within the chassis 12. As discussed above, known entertainment PCs include a motherboard having a CPU mounted thereto, where the motherboard 28 is mounted to the bottom panel within the PC chassis so that CPU is facing upward.

According to the invention, the motherboard 28 is mounted to an inside surface of the top panel 14 so that the CPU 30 is facing downward toward the bottom panel 18, where the CPU 30 is mounted upside down. Further, the bottom panel 18 includes a series of ventilation openings 32 that normally would be in the top panel of the known entertainment PCs. In one non-limiting embodiment, the ventilation openings 32 are a series of parallel slots. A cooling fan 34 positioned within the chassis 12 draws air through the openings 32 in the bottom panel 18 to provide cooling for the CPU 30. The cooling fan 18 can either draw air into the chassis 12 or force air out of the chassis 12. Thus, the spacing provided by the feet 20 and 22 allows ventilation air to be circulated from the bottom of the chassis 12. By mounting the CPU 30 in this manner facing down towards the bottom panel 18, the air exhausted out of the back of the chassis 12 will rise up and not be able to re-enter the chassis 12 through the ventilation openings 32.

In one embodiment, the already available entertainment PC chassis can merely be turned upside down, where the feet are mounted to what was formerly the top panel. In this design, a piece of metal may be mounted to the now top panel to make it more aesthetically pleasing.

Figure 2:
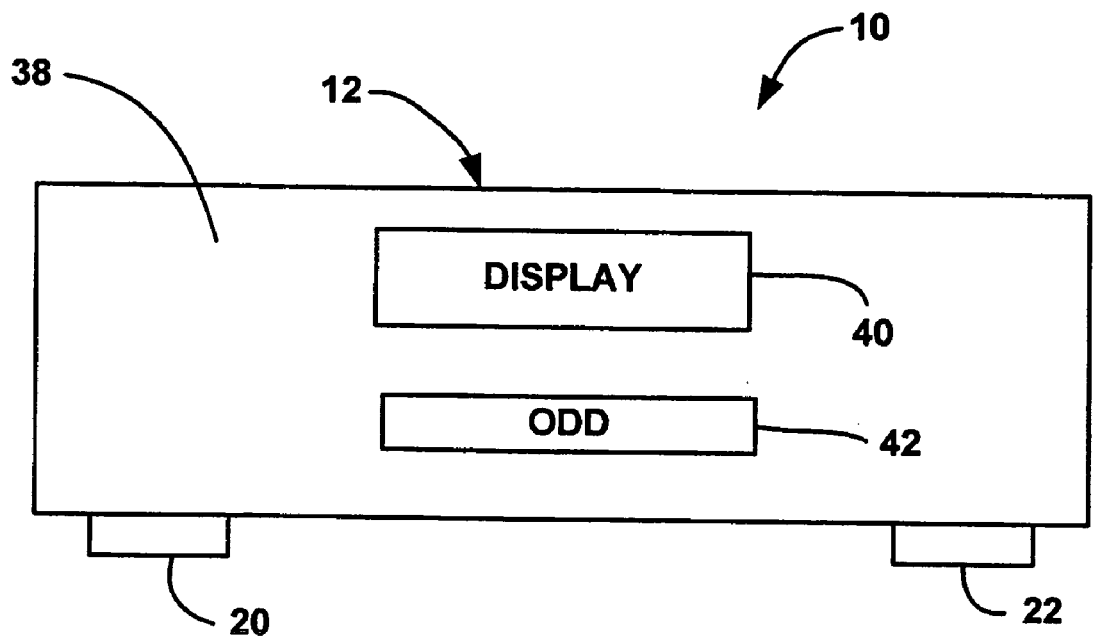
FIG. 2 is a front view of the entertainment PC of FIG. 1 showing an optical drive device below a display device, according to an embodiment of the present invention.

FIG. 2 is a front view of the entertainment PC 10 where a front panel 38 is now shown. Because the CPU 30 is mounted to the top panel 14, a display device 40, such as a vacuum fluorescent display (VFD), or other suitable type of display, can be mounted to a top area of the front panel 38 proximate the CPU 30. Further, an optical drive device (ODD) 42, normally mounted above the display device 40 in the known entertainment PCs, can be mounted below the display device 40. The ODD 42 includes a tray that ejects to accept an optical disk. Thus, when the tray associated with the ODD 42 is opened, it will not block the information displayed on the display device 40.

The foregoing discussion discloses and describes merely exemplary embodiments of the present invention. One skilled in the art will readily recognize from such discussion, and from the accompanying drawings and claims, that various changes, modifications or variations can be made therein without departing from the spirit and scope of the invention as defined in the following claims.

What is claimed is:

1. An electronic device comprising:
   a chassis including a top panel, a bottom panel and a front panel, said bottom panel including a plurality of ventilation openings and a plurality of feet mounted to the bottom panel;
   a motherboard mounted within the chassis to the top panel; and
   a CPU mounted to the motherboard so that the CPU faces downward toward the bottom panel.

2. The electronic device according to claim 1 further comprising a display device and an optical drive device, said display device being mounted to the front panel above the optical drive device.

3. The electronic device according to claim 2 wherein the display device is a vacuum fluorescent display device.

4. The electronic device according to claim 1 further comprising a fan mounted within the chassis, said fan circulating air through the chassis.

5. The electronic device according to claim 4 wherein the fan either draws air into or forces air out of the ventilation openings.

6. The electronic device according to claim 1 wherein the ventilation openings are parallel slots.

7. The electronic device according to claim 1 wherein the electronic device is an entertainment device.

8. The electronic device according to claim 7 wherein the entertainment device is an entertainment PC.

9. An electronic device comprising:
   a chassis including a top panel, a bottom panel mounted with a plurality of feet, and a front panel;
   a display device mounted to the front panel; and
   an optical drive device mounted to the front panel below the display device.

10. The electronic device according to claim 9 wherein the display device is a vacuum fluorescent display device.

11. The electronic device according to claim 9 further comprising a series of ventilation openings in the bottom panel.

12. The electronic device according to claim 11 wherein the ventilation openings are parallel slots.

13. The electronic device according to claim 9 further comprising a fan mounted within the chassis, said fan circulating through the chassis.

14. The electronic device according to claim 13 wherein the fan either draws air into or forces air out of the ventilation openings.

15. The electronic device according to claim 9 wherein the electronic device is an entertainment PC.

16. An entertainment PC comprising:
   a chassis including a top panel, a bottom panel and a front panel, said bottom panel including a plurality of ventilation openings;
   a motherboard mounted within the chassis to the top panel;
   a CPU mounted to the motherboard so that the CPU faces downward toward the bottom panel;
   a display device mounted to the front panel;
   an optical drive device mounted to the front panel below the display device;
   a fan mounted within the chassis for circulating air through the chassis; and
   a plurality of feet mounted to the bottom panel.

17. The entertainment PC according to claim 16 where the fan either draws air into or forces air out of the ventilation openings.

18. The entertainment PC according to claim 16 wherein the ventilation openings are parallel slots.

19. The entertainment PC according to claim 16 wherein the display device is a vacuum fluorescent display device.

* * * * *